Sept. 10, 1968          C. P. O'REGAN          3,401,322
                        SLOW SPEED MOTOR Filed May 17, 1965                           5 Sheets-Sheet 1

CHARLES P. O'REGAN
INVENTOR.

BY *S.A. Giarratana*
   *F.L. Masselle*
   *G.B. Fujiwolk*

ATTORNEYS

Sept. 10, 1968  C. P. O'REGAN  3,401,322
SLOW SPEED MOTOR
Filed May 17, 1965  5 Sheets-Sheet 4
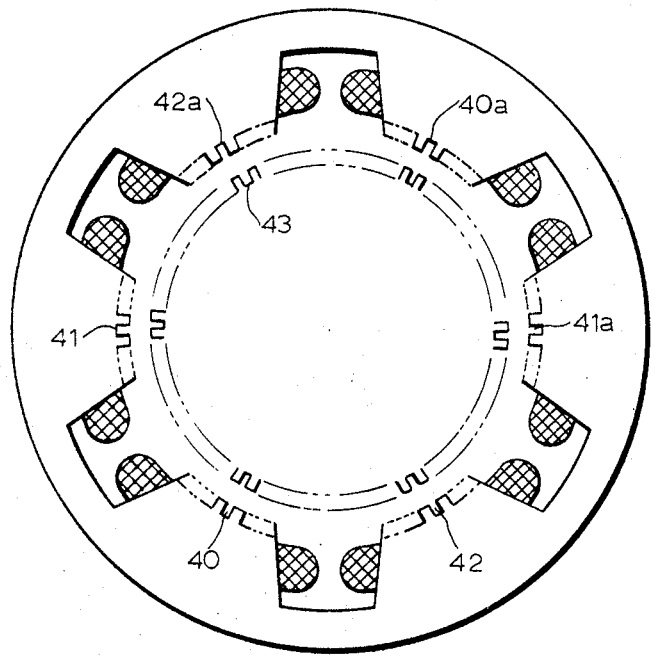
FIG. 4
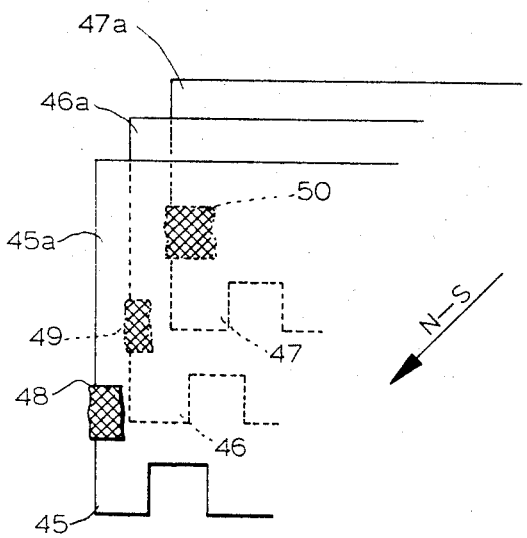
FIG. 5
ROTOR
CHARLES P. O'REGAN
INVENTOR.
BY 
ATTORNEYS United States Patent Office 3,401,322
Patented Sept. 10, 1968

3,401,322
SLOW SPEED MOTOR
Charles P. O'Regan, Bronx, N.Y., assignor to General Precision Inc., Little Falls, N.J., a corporation of Delaware
Filed May 17, 1965, Ser. No. 456,170
1 Claim. (Cl. 318—138)

ABSTRACT OF THE DISCLOSURE

Slow speed motor having at least three sets of teeth on the stator member, the teeth in each set being of the same pitch and also of the same pitch as the rotor teeth, the teeth in each of set being offset from the teeth in the other two sets by one-third of a tooth pitch, and means to magnetically energize each set of teeth sequentially causing the rotor teeth to sequentially align themselves with each set of the stator teeth.

---

The present invention relates to slow speed motors, and more particularly to slow speed motors which can readily be installed in space vehicles.

In conventional motors, the synchronous speed of the motor depends on the A-C frequency and the number of poles. Although a slower speed motor can be provided by increasing the number of poles, there is, of course, a practical limit to the number of poles which can be placed on a motor. In the R. Walker et al U.S. Patent No. 2,993,200 and the R. Walker et al U.S. Patent No. 2,995,705, it was shown that an optical vernier could be provided with two discs having alternate transparent and opaque portions along the periphery provided that one disc had one more (or one less) opaque portion than the other. As the discs revolved from one opaque portion to the next adjacent portion, a shadow would turn across the entire circumference of the discs causing in essence a multiplication of the angle of rotation, i.e., one revolution for each movement from one opaque portion to the next. The same principle is also used in the G. O. Frederickson Reissue U.S. Patent No. Re. 25,445. Here, teeth are successively aligned in sequence causing the rotor to slowly creep around the stator as succeeding teeth are aligned in the center of a rotating field. Although suitable for certain purposes, this type of slow speed motor permits only a limited number of discrete speeds. The present invention contemplates a motor which is more flexible in design and offers a much less restricted choice of speeds than the motors of the prior art.

With the foregoing and other objects in view, the invention resides in the novel arrangement and combination of components and in the details of construction hereinafter described, it being understood that changes in the precise embodiments of the invention herein disclosed may be made within the scope of what is described without departing from the spirit of the invention.

The advantages of the invention will become apparent from the following description taken in conjunction with the accompanying drawing in which:

FIG. 2b is a sectional view along the line 2b—2b of FIG. 2a;

Fig. 4 depicts another embodiment of the inventive concept by a partly schematic side view of a motor contemplated herein;

FIG. 5 shows still another embodiment of the motor contemplated herein in a perspective view of a portion of the rotor and stator.

To properly understand this invention, it is first necessary to visualize what is accomplished. After the underlying principles are understood, the embodiment of these principles in a practical device will be more evident.

Figure 1A:
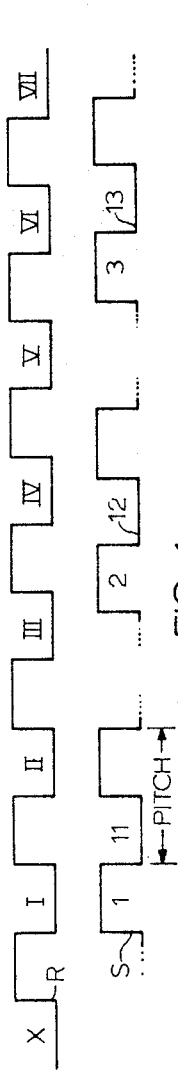
FIG. 1a to 1d illustrates schematically the basic concept which is used in the preesnt invention.
Figure 1B:
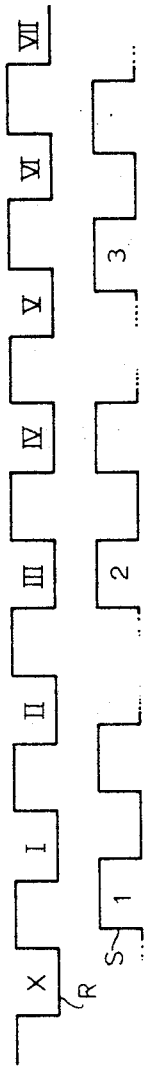
Figure 1C:
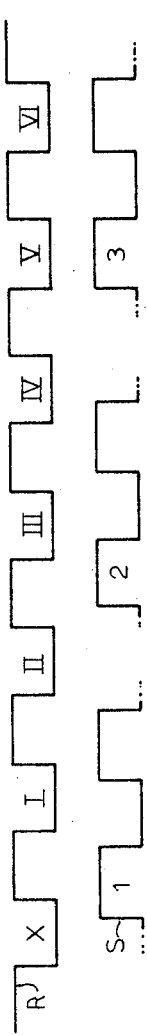
Figure 1D:
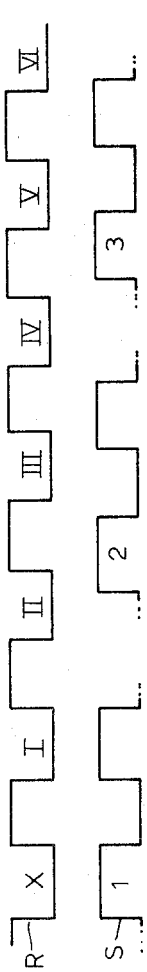

Shown in FIG. 1a is a symbolic diagram of a motor having a rotor R and a startor S. Rotor R has a series of teeth bearing Roman numerals I, II, III . . . X around the periphery thereof. The teeth on the rotor and stator and the distance between teeth are the same for this explanation, and the distance between teeth on the rotor is equal to the width of one tooth. On the stator, the distance between teeth for each set of teeth 1, 2 and 3, i.e., the distance 11, 12 and 13, are equal and equal to the corresponding spacing between teeth on the rotor. However, each set of teeth, 1, 2 and 3, is offset from the adjacent set of teeth by one-third of the pitch space, i.e., by two-thirds of a tooth space, the pitch distance being equal to one tooth plus one space. Since in specific designs the spacing between teeth is not always equal to the width of the teeth, it is best to think in terms of the pitch distance rather than the tooth width.

Assume therefore that the stator teeth will be sequenially enabled by windings, not shown, from a three-phase power supply. Each set of stator teeth 1, 2 and 3 will be enabled in that sequence in continuous repetition. When the stator teeth of set 1 are enabled, the rotor teeth nearest thereto, i.e., teeth I and II will align themselves with the opposite stator teeth. Rotor teeth III and IV are offset one-third of a tooth from the second set of stator teeth, i.e., set 2. Rotor teeth VI and VII are one-third a tooth past set 3 of the stator teeth. When next set 2 of the stator teeth is enabled, rotor teeth III and IV align themselves with the teeth of set 2. Rotor teeth I and II are two-thirds past the teeth of set 1. Teeth V and VI are one-third over the teeth of stator set 3. On the third phase, set 3 of the stator teeth are enabled. Rotor teeth V and VI are aligned with the stator teeth of set 3. Rotor tooth X is now one-third over the first tooth of stator teeth set 1 and, at the next phase when stator teeth 1 are enabled, rotor tooth X will be aligned with tooth 1, and the entire rotor will have moved over one tooth in the foregoing three-phase sequence.

Figure 2A:
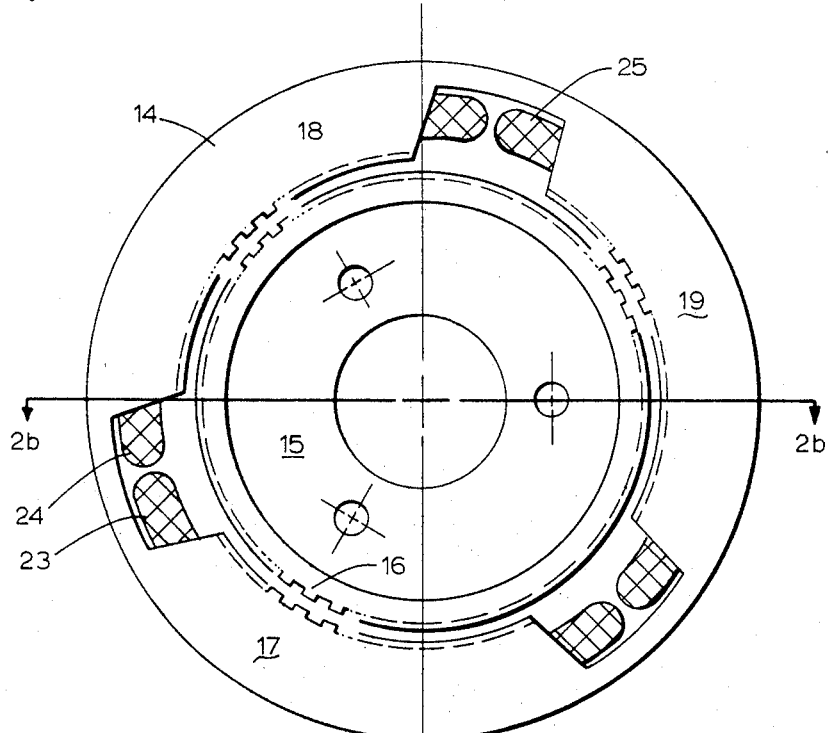
FIG. 2a is a side view of a motor partly in cross-section having embodied therein the basic concept illustrated schematically in FIG. 1.
Figure 2B:
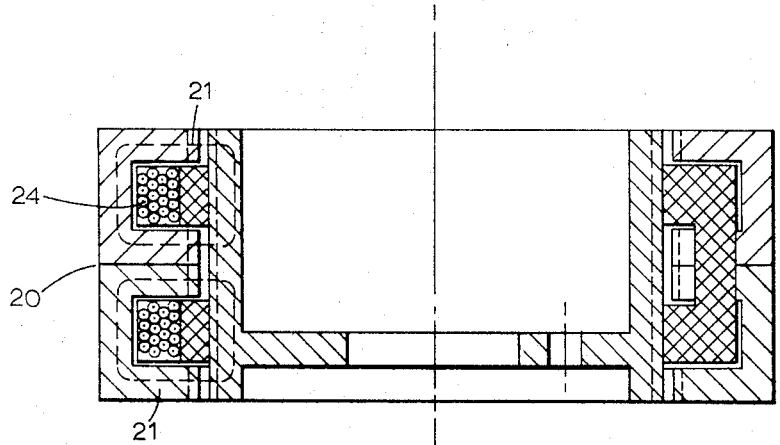

The arrangement illustrated theoretically in FIGS. 1a to 1d is carried out into practice in FIGS. 2a and 2b where a motor is shown having a stator 14 and a rotor 15. There are 120 evenly-spaced teeth 16 on the rotor which are spaced three degrees apart. There are three sets of teeth 17, 18, 19 on the stator with the same spacing as the rotor teeth. These sets of stator teeth are displaced one-third of a tooth pitch (1 degree) from each other. Each of these sets of teeth have two poles and a flux path through the rotor, as shown by the dotted line. As shown in FIGS. 2b, each set of stator teeth consists of one center pole, i.e., a center North pole 20 and two outer or South poles 21. Windings 23, 24, 25 are wound around the center pole of each set of stator teeth. Whenever a stator teeth set of pole pairs are energized, the adjacent rotor teeth will align with the energized stator teeth to achieve the minimum reluctance position. When the next pole pair (either direction) and its teeth are energized, the rotor teeth, adjacent, but out of phase ⅓ tooth pitch or one degree, will align with these newly energized teeth. As this occurs, the rotor must advance one degree and develop torque in accordance with the electromagnetic force developed at the air gap. It is seen, therefore, that if the three pole pairs are energized in sequence, the rotor will rotate in the direction of this rotating sequence. The complete sequence will rotate the rotor one rotor pitch or three degrees and thus one shaft revolution requires 120 repetitions of the sequence. A no-starting torque condition is not possible since there is no initial rotor position that will find all three pole pairs simultaneously in a tooth-in-line, no-start condition.

Figure 3:
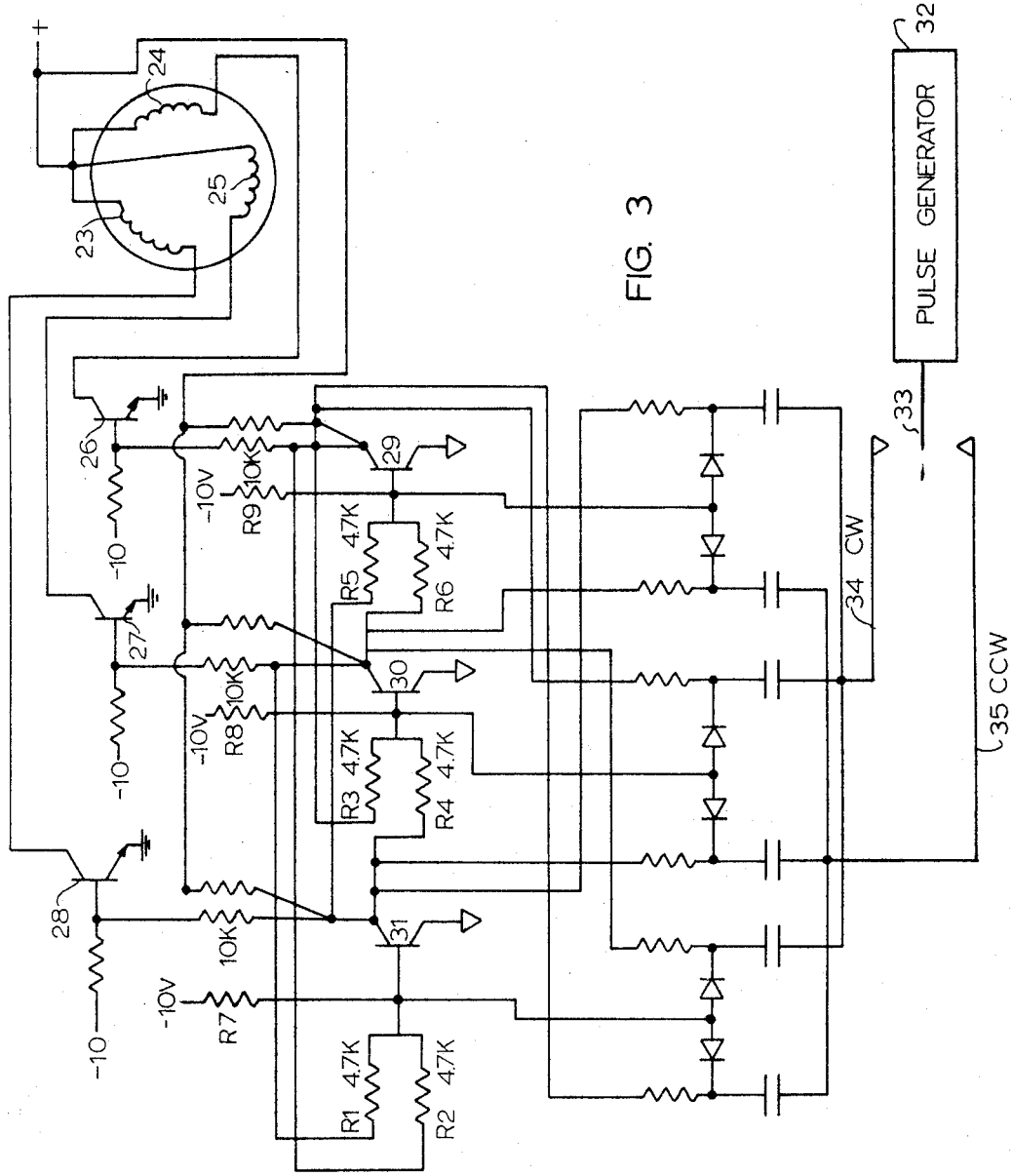
FIG. 3 shows a transistor circuit diagram used in energizing the separate coils of the motor shown in FIGS. 2a and 2b.

In a space vehicle, the source of power will be a battery or fuel cell, i.e., a D-C supply. Three square-wave inputs can sequentially enable the three stator coils by means of the circuit of FIG. 3. Here, windings 23, 24, 25, for the three sets of stator teeth will be sequentially enabled by transistors 26, 27, 28. One side of the windings are connected to the plus terminal, the other side is connected to the emitters of the respective transitors. The collectors of transistors 26, 27, 28 are grounded. The sequence is controlled by a second set of transistors, 29, 30, 31. The second set of transistors 29, 30, 31 are in turn controlled by a set of pulses supplied by a pulse generator 32. One pulse will enable two transistors at a time so that for the second set of transistors, the sequence is that transistors 29 and 30; 30 and 31; 31 and 29 and again 29 and 30 will be enabled. The action of the second set of transistors on the first set of transistors is that of inversion. Therefore, when transistors 29 and 30 are enabled, transistors 26 and 27 are non-conducting; while since transistor 31 is non-conducting, transistor 28 will conduct and energizes coil 23 acting on the teeth in set 17. This sequence is repeated so that 26 and 27 conduct sequentially. Pulse generator 32 is connected to the transistor circuit by a two pole switch. This connects to a clockwise (CW) terminal 34 and a counter-clockwise (CCW) terminal 35. These terminals each separately will enable transistors 29, 30 and 31, one in the CW sequence, the other in the CCW sequence.

Although the device just described is suitable for some purposes and provides a good theoretical explanation, it suffers from the defect that an unbalanced radial force situation is created on the rotor. This can be readily overcome by dividing the sets of teeth into two diametrically-opposite groups. There will thus be six groups of teeth on the stator, 40, 40a; 41, 41a; 42, 42a. Groups 40 and 40a which are diametrically opposite form a first set of stator teeth. Similarly, groups 41 and 41a as well as groups 42 and 42a form second and third sets of stator teeth. Groups 40 and 40a are simultaneously energized, and the rotor teeth 43 will align themselves with the teeth of stator groups 40 and 40a. Since these groups are on diametrically-opposite sides of the stator, no unbalanced radial force is created by this situation. The same action takes place when teeth groups 41, 41a and 42, 42a are energized.

Another good arrangement is to have three pairs of axial teeth sets 45, 46, 47. Each pair is axially offset from the other set by one-third of the pitch. Each set of teeth 45, 46, 47 are on the inward end of a plate, 45a, 46a, 47a. Each plate has a separate winding 48, 49, 50. Each winding will be sequentially energized by the circuit of FIG. 3 and the motor will then creep along in increments of one-third of a tooth.

Figure 6:
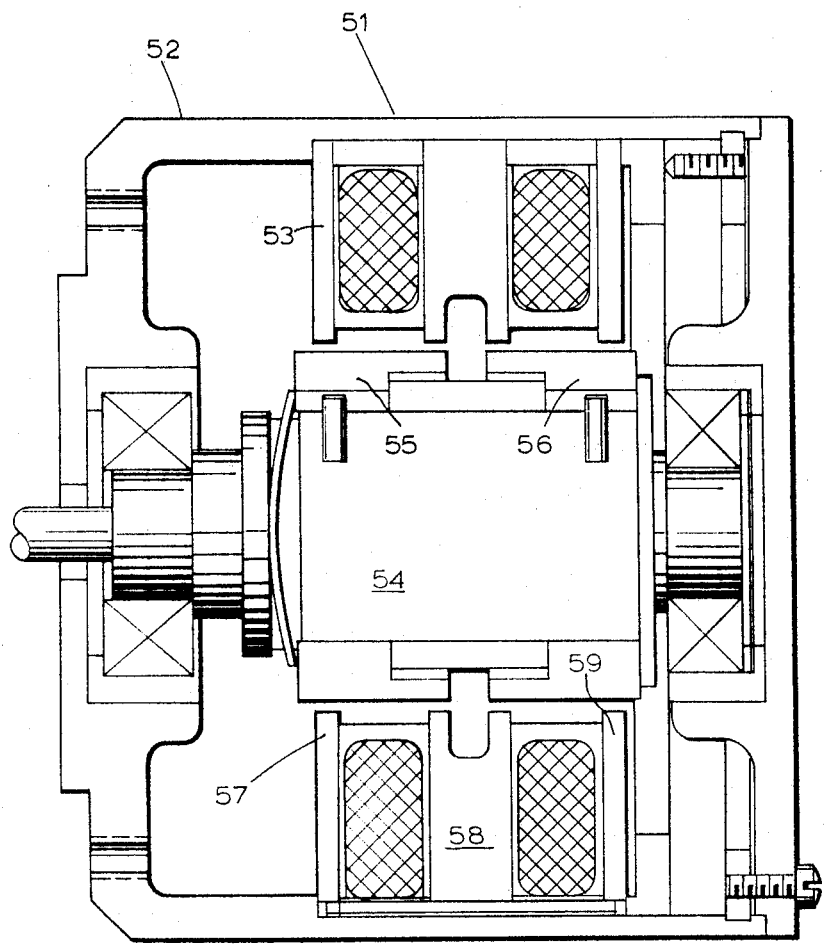
FIG. 6 illustrates in a longitudinal cross-sectional view yet another possible embodiment.

The invention contemplated need not have only three sets of teeth, but may have more, e.g., four sets of teeth, as shown in FIG. 6 showing a motor 51 in a housing 52 with an outer stator 53 and inner rotor 54. This arrangement is designed to operate off a two-phase, A-C line and has four sets of teeth. Since each phase has a positive and negative voltage, there are effectively four inputs; two positive and two negative. The rotor has two sets of outer longitudinal teeth 55 and 56 which are offset by ¼ pitch. The rotor teeth 55 and 56 are opposed by front, center and rear sets of inner stator longitudinal teeth 57, 58 and 59. Front and rear stator teeth 57 and 59 are separated from center teeth 58 by one-half a pitch; the front and rear teeth are, therefore, in line. For simplicity of illustration, in FIG. 6, the electrical circuitry has been omitted. But, a chart similar to FIGS. 1a to 1d can readily be made to visually appreciate the rotor movement.

It is to be observed, therefore, that the present invention provides for a slow speed motor having a rotor member and a stator member wherein the teeth on one of said members, preferably the stator, are evenly spaced thereon and the second of said members has three sets of teeth thereon in face-to-face relation with the teeth of the one member, the teeth in each set being offset from the teeth in the other two sets by one-third of one tooth pitch. Magnetic means sequentially energize each set of teeth magnetically to cause the rotor to turn one-third of a pitch each time one set of teeth is energized. To minimize unbalance each time one set of teeth is energized, the sets can be divided into two diametrically-opposite groups each. Or, the three sets of teeth can be axially disposed around the circumference of said member. The magnetic means can include first, second and third coil sets for each of the three sets of teeth; first, second and third sets of transistors coupled to each of said coil sets to sequentially energize the coil sets in the one or the other sequence; clock pulse means to enable the transistor sets; and two pole switch means between the transistor sets and the clock pulse means to determine the sequence of energization.

More generally, the present invention can be extended to employ $n$ (any number) set of teeth wherein the teeth of any one set are offset from the adjacent two sets by plus and minus $1/n$ pitch distance, respectively. An adjacent set of stator teeth is one preceding or following the referenced set in the sequence of electrical phasing. For example, the 4 phase, i.e., 4 set motor shown in FIG. 6, has four groups of stator teeth and a winding enveloping each group of teeth such that the sequential energizing of the windings result in ¼ pitch movements of the field.

This concept can be readily applied in other forms without departing from the scope and spirit of this invention. To illustrate, but not restrict the intended scope of this invention, a linear actuator for controlled positioning could be made by flat strips of teeth and similar windings. This variation is akin to that between a pair of toothed gears and toothed racks.

What is claimed:

1. In a slow speed motor having a rotor member and a stator member, the improvement therein wherein said rotor member has evenly spaced teeth thereon and the stator member has three sets of teeth thereon in face-to-face relation with the teeth of said rotor member, the teeth on each member, and in each set being of the same pitch but the teeth in each set being offset from the teeth in the other sets by one-third of one tooth pitch, each of said three sets of teeth having two diametrically-opposite groups of teeth so that when one set is magnetically energized, the ressulting radial forces caused will tend to cancel, and magnetic means to sequentially energize each set of teeth magnetically, including first, second and third coil sets for each of the three sets of teeth, a first set of transistors coupled to each of said coil sets respectively for sequential energization thereof, a second set of transistors coupled to each of said transistors in said first set respectively, clock pulse means for sequentially enabling a different pair of transistors in said second set in a cyclic manner, said transistors in said first set being disenabled when a corresponding pair of transistors in said second set are enabled as herein foresaid, and two pole switch means between the transistor sets and the clock pulse means to determine the sequence of energization.

References Cited

UNITED STATES PATENTS

| | | | |
|---|---|---|---|
| 2,627,040 | 1/1953 | Hansen | 310—49 |
| 3,112,433 | 11/1963 | Fairbanks | 318—138 |
| 3,124,735 | 3/1964 | Sampietro et al. | 318—254 XR |
| 3,127,548 | 3/1964 | Van Emden | 318—254 |
| 2,827,582 | 3/1958 | Krebs | 310—168 |
| 2,945,141 | 7/1960 | Van De Graff et al. | 310—168 X |
| 2,982,872 | 5/1961 | Fredrickson | 310—49 X |
| 3,077,555 | 2/1963 | Fredrickson | 318—254 |
| 3,165,684 | 1/1965 | Ensink et al. | 318—138 |
| 3,293,459 | 12/1966 | Kreuter et al. | 310—49 |

ORIS L. RADER, *Primary Examiner.*

G. SIMMONS, *Assistant Examiner.*